United States Patent [19]
Roth

[11] 3,739,081
[45] June 12, 1973

[54] METHOD AND APPARATUS FOR COLOR SUBCARRIER GENERATION

[75] Inventor: Stephen A. Roth, Beaverton, Oreg.

[73] Assignee: Tektronix, Inc., Beaverton, Oreg.

[22] Filed: Mar. 22, 1971

[21] Appl. No.: 126,702

Related U.S. Application Data

[63] Continuation-in-part of Ser. No. 101,915, Dec. 28, 1970, abandoned.

[52] U.S. Cl. 178/5.4 R, 178/69.5 CB, 178/5.4 SY, 178/5.4 SD
[51] Int. Cl. ............................................. H04n 9/46
[58] Field of Search .............. 178/69.5 CB, 5.4 SY, 178/5.45 SD

[56] References Cited
UNITED STATES PATENTS

| | | | |
|---|---|---|---|
| 2,754,356 | 7/1956 | Espenlawb | 178/69.5 CB |
| 2,766,321 | 10/1956 | Parker | 178/5.4 SY |
| 2,848,537 | 8/1958 | Richman | 178/5.4 SY |
| 3,133,149 | 5/1964 | Inaba | 178/5.4 SY |
| 3,148,243 | 9/1964 | Wiencek | 178/5.4 SY |

OTHER PUBLICATIONS

"Automatic Controls," Electronics, May 15, 1959, pages 58–59.

Primary Examiner—Richard Murray
Assistant Examiner—F. I. Konzem
Attorney—Buckhorn, Blore, Klarquist and Sparkman

[57] ABSTRACT

A color subcarrier signal is gated by DC restoration subsequent to synchronous demodulation. DC restoration is provided the demodulated signal relative to detected peaks of the color subcarrier synchronizing burst envelope. The DC restored signals are employed for controlling a color subcarrier oscillator producing the local subcarrier frequency utilized for the synchronous demodulation.

34 Claims, 9 Drawing Figures

3,739,081

METHOD AND APPARATUS FOR COLOR SUBCARRIER GENERATION

CROSS REFERENCE TO RELATED APPLICATION

This application is a continuation-in-part of my application Ser. No. 101,915, filed Dec. 28, 1970, entitled, "Method and Apparatus for Color Subcarrier Generation", now abandoned.

BACKGROUND OF THE INVENTION

Demodulation of color television information is accomplished by means of a local subcarrier generated in synchronism with a color subcarrier synchronizing burst provided on the back porch of the color television signal. The desired synchronization may be accomplished in a variety of ways. The transmitted color burst may be coupled to a phase detector providing an output for controlling the local color subcarrier oscillator, which in turn balances the phase detector as well as providing a signal for accomplishing synchronous demodulation. This system is fairly complicated and really requires double detection, i.e. separate detection of the color burst and the color signal information. Such a system provides maximum opportunity for phase error problems. Alternatively, a local crystal filter in a receiver may be employed which rings between subcarrier bursts but this system is somewhat less accurate. It is also possible to detect the color subcarrier burst signal at the output of the synchronous demodulators from which demodulated color information is obtained. This arrangement eliminates the necessity for duplicate detection and tends to reduce phase error problems. DC restoration or clamping may be accomplished with respect to the color subcarrier burst envelope, and the same may be used as an error signal, but unfortunately, the exact time thereof is generally unknown. The color subcarrier burst may occur at some time within predetermined limits on the back porch of the color television waveform, i.e. following the horizontal synchronization pulse and before the conclusion of horizontal blanking. Heretofore, the time of the conclusion of the horizontal synchronization pulse has been detected and some timing means, such as a multivibrator, has been employed for initiating DC restoration approximately at the time of the color burst. Since the timing must be proper for the DC restoration to provide the proper error signal, and since the exact time of the color burst is unknown, the delay produced by the multivibrator or similar delay device is generally adjustable. Thus, in test instruments and the like, the time of the burst "flag" is adjusted whereby proper timing takes place. Proper setting is difficult and improper setting is not always detected, leading to improper operation of equipment.

SUMMARY OF THE INVENTION

According to the method and apparatus of the present invention, a demodulated color subcarrier synchronizing burst signal is employed to gate itself at the time of the peak of the burst envelope. An output is produced representative of the amplitude of the detected burst signal. The local subcarrier signal is then controlled by means of such output.

In illustrated embodiments, gating is accomplished by DC restoration. The color synchronizing burst envelope is detected from a synchronously demodulated output and a reference value is set at times determined according to peak detection of the color synchronizing burst envelope.

In accordance with a particular embodiment of the present invention, the detection is accomplished by means of a "four quadrant" peak detector deriving inputs from both quadrature and phase control demodulation channels. In another embodiment, a single quadrant peak detector is employed.

It is accordingly an object of the present invention to provide an improved method and apparatus for generating a television color subcarrier signal.

It is a further object of the present invention to provide an improved method and apparatus for generating a local color subcarrier signal without requiring a timing adjustment relative to the occurrence of a color subcarrier burst signal.

It is another object of the present invention to provide an improved means and apparatus for generating a television color subcarrier signal in accurately timed relation with the color synchronizing burst.

It is another object of the present invention to supply a reference signal corresponding to a color television synchronizing burst signal.

It is a further object of the present invention to provide an improved method and apparatus for detecting a color synchronizing burst signal.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 1:
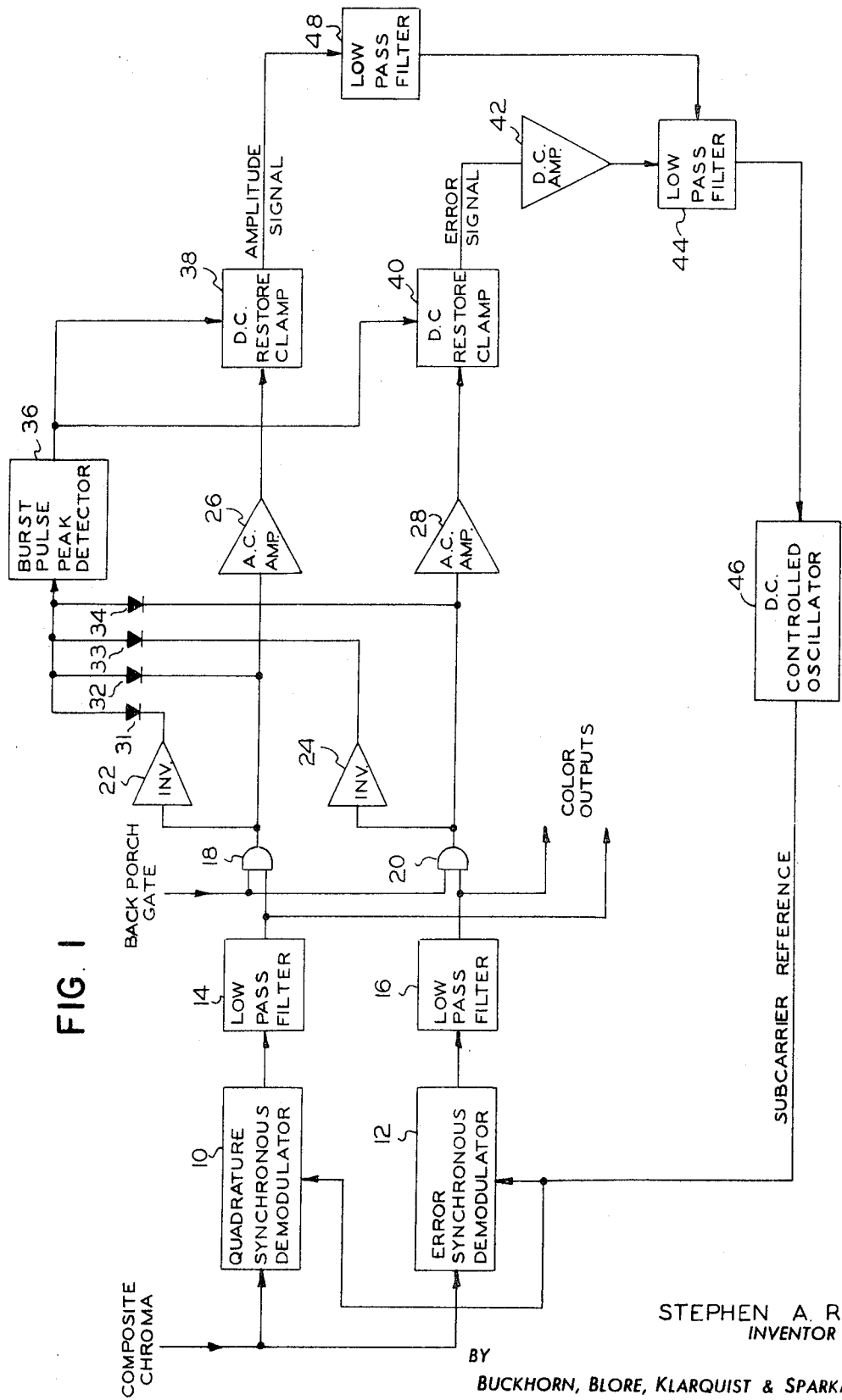
FIG. 1 is a block diagram of a first apparatus according to the present invention.

Referring to the drawings, and particularly FIG. 1 illustrating a first embodiment of the invention, a composite chroma signal is applied to quadrature synchronous demodulator 10 and error synchronous demodulator or phase control synchronous demodulator 12. The composite chroma information comprises the color synchronizing burst and the color signal information generally referenced to a common zero axis, i.e. AC coupled. The quadrature synchronous demodulator 10 generally detects a color difference signal such as B-Y, while phase control synchronous demodulator 12 detects a color difference signal such as R-Y. The outputs of the demodulators are respectively coupled through the low-pass filters 14 and 16, which may be considered to be part of the demodulators themselves. The outputs of filters 14 and 16 may be coupled to a color matrixing circuit for producing primary colors for application to color picture tube apparatus.

According to this embodiment of the present invention, the above mentioned outputs are also applied via and-gates 18 and 20 to AC amplifiers 26 and 28 as well as inverters 22 and 24 respectively. And-gates 18 and 20 also receive a back porch gate input for substantially the entire time of the television signal back porch upon which the color synchronizing burst is conventionally found.

The outputs of and-gates 18 and 20 are coupled to burst pulse peak detector 36 by way of diode rectifiers 31, 32, 33, and 34. Diodes 32 and 34 are directly coupled between and-gates 18 and 20 and the input of the detector 36, while diodes 31 and 33 couple inverted and-gate outputs to the detector 36. The anodes of the diodes are connected together at the input of the peak detector. The detector operates DC restore clamps 38 and 40 which also receive the outputs of amplifiers 26 and 28 respectively. Thus, DC restore clamp 38 clamps the output of amplifier 26 at a level corresponding to the color synchronizing burst peak, while DC restore clamp 40 similarly clamps the output of amplifier 28 at a level corresponding to the color synchronizing burst peak.

An error signal output from clamp 40 is coupled by way of DC amplifier 42 and low-pass filter 44 to a DC controlled oscillator 46. An amplitude signal output derived from clamp 38 is coupled through the low-pass filter 48 for selectively operating low-pass filter 44. In the presence of the amplitude signal output, low-pass filter 44 passes primarily low frequency variations of the error signal output. However, in the absence of a detected amplitude signal, low-pass filter 44 will pass a broader frequency range. DC controlled oscillator 46 is under the control of the output of low-pass filter 44. The DC controlled oscillator includes a varactor coupled to or associated with the oscillator's tuned circuit for influencing the frequency of the oscillator under the control of the output of filter 44. The output of oscillator 46 is utilized as the subcarrier reference signal for operating synchronous demodulators 10 and 12 in the usual manner.

Figure 4:
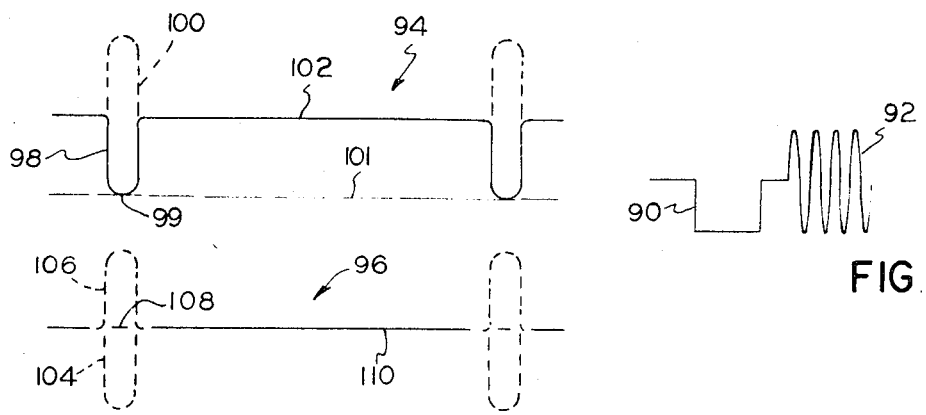
FIG. 4 is a waveform chart illustrative of operation of circuits according to the present invention.
Figure 3:
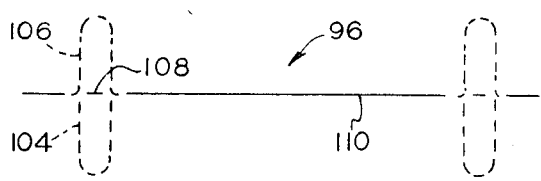
FIG. 3 is a waveform illustration including a horizontal synchronization pulse and color synchronization burst signal.

Further considering operation of the FIG. 1 circuit according to the present invention, the demodulated outputs from demodulators 10 and 12 coupled by way of filters 14 and 16 are gated into the remainder of the circuit, according to the present invention, only during the time when a color synchronizing burst may occur, i.e. for substantially the entire back porch of the color television waveform. A portion of the color television waveform is illustrated in FIG. 3 and is shown inverted in this particular instance. A horizontal synchronization pulse is illustrated at 90 and a color synchronizating burst signal is illustrated at 92 on the "back porch" following the horizontal synchronization pulse. This burst consists of a few cycles at the color subcarrier frequency to which it is desired to lock oscillator 46. As hereinbefore mentioned, the color synchronization burst, according to the prior art, has been detected by providing an adjustable delay following detection of the horizontal synchronization pulse, inasmuch as the exact location of the color synchronizing burst was not accurately fixed. In the present circuit, gates 18 and 20 are enabled for the duration of the back porch, i.e. from the end of the horizontal synchronization pulse to the conclusion of horizontal blanking. The color synchronizing burst envelope is then detected by means of diodes 31, 32, 33, and 34. Such an envelope is indicated at 98 in FIG. 4 illustrating a waveform 94 which may comprise the FIG. 1 amplitude signal. Since the color burst has been synchronously demodulated, a pulse-shaped envelope is present rather than the individual cycles of the color burst.

The diodes 31 through 34 are poled to detect a negative going burst envelope, and detector 36 detects the most negative envelope peak delivered by any one of the diodes 31–34. The circuit should be initially considered as in an unsynchronized condition wherein detection is incomplete, whereby any of the diodes, 31–34, may detect the most negative peak signal. This negative peak is employed to provide a predetermined reference value for gating or sampling the outputs of amplifiers 26 and 28 by DC restoration.

Then in a locked or desired "on-frequency" condition for the circuit, wherein the color synchronizing burst is detected and employed correctly for synchronous demodulation, the amplitude signal and the error signal present will be as illustrated in full line respectively at 94 and 96 in FIG. 4. Thus, the output of DC restore clamp 38 will include the burst envelope 98. Accordingly, diode 32 will detect the same, and peak detector 36 will register the peak value thereof. DC restore clamp 38 then establishes the peak level or lower tip level 99 of the envelope 98 at a predetermined DC value 101. At this time, the error signal color burst envelope has substantially zero amplitude as illustrated at 108. If the synchronous demodulation process in demodulators 10 and 12 does not take place properly for producing the desired color difference signals, then the phase between the composite chroma and the subcarrier will change leading to varying amplitude signal and error signal outputs. Only when the subcarrier reference is in exact time with the color burst signal will the phase control synchronous demodulator essentially produce a zero output during the time of the color subcarrier burst, while demodulator 10 produces maximum output. That is, in the synchronized condition, the output of controlled oscillator 46 will be in exact quadrature with the received color burst, and exactly in phase with the quadrature version thereof. Then, should the frequency of controlled oscillator 46 vary slightly from the desired subcarrier reference frequency, the amplitude of the burst envelope in the error signal channel will change in a direction for correcting the subcarrier reference frequency.

Actually, since the tips of the color burst envelopes are clamped at a predetermined voltage value, the level between color bursts will change in this embodiment relative to this clamped DC level. Thus, a DC level 110 in FIG. 4 may vary above or below clamp level 108 if oscillator 46 varies from the correct frequency. At the same time, level 102 will vary with respect to the clamped tip level of envelope 98.

Before the circuit initially becomes synchronized, whereby proper subcarrier reference frequency is generated by oscillator 46, the maximum negative peak may be detected by any of the diodes 31, 32, 33, or 34, as hereinbefore mentioned, with the corresponding envelopes being illustrated at 100, 98, 106, and 104, respectively, in FIG. 4. It is understood that before proper synchronization, the envelopes are instantaneously varying. The waveform is clamped relative to the most negative peak present as detected via any of the diodes, or all of the diodes successively, and control signals are produced with respect to such value. As a peak is detected by peak detector 36, the feedback path for controlling the frequency of oscillator 46 changes such frequency in a direction for achieving the condition illustrated in full lines in FIG. 4. Before locking, the error signal will in general comprise an alternating current signal representing the difference between the frequency of the color burst and the actual frequency of oscillator 46. The error signal provided to oscillator 46 tends to "pull" the frequency of the oscillator inasmuch as this error signal is conventionally coupled to a varactor in the tuned circuit of the oscillator. The output frequency of oscillator 46 will vary back and forth at a rate dependent upon the frequency of the error signal. However, as the frequency of the oscillator 46 varies in one direction, the error and the frequency of the error signal decreases. The error signal waveform is found to exhibit an asymmetry producing a DC component which acts to promote reduction of error and of the frequency of the error signal. I.E., the DC component is coupled in a polarity direction for moving the oscillator frequency closer to the desired frequency.

Diodes 31 through 34 complete a "four quadrant" peak detector wherein a peak is substantially always detected, with the peak passing the four diodes at times 90° apart in the error signal waveform. In some embodiments, such as hereinafter described, only one diode, i.e. diode 32, may be required. However, locking to the desired frequency or phase may be delayed if one diode is used in the FIG. 1 circuit, and if oscillator 46 is very stable or controlled by another standard in the absence of the aforementioned error signal waveform, and if an error signal occurs and remains in exactly the wrong phase for causing conduction in diode 32. Four diodes are preferred for optimized operation in this situation.

The DC restoring accurately achieved by means 38 and 40 takes place at the exact time of the peaks of the burst envelope without any means being required to time artificially the presence of the color synchronizing bursts. The burst is essentially employed to gate itself by DC restoration of the demodulated signal at the time of the peak of the burst envelope. The timing will always be exact even though the time of occurrence of the color burst relative to the horizontal synchronizing pulse may vary. Consequently, no adjustment is required for "finding" the color burst.

In the FIG. 1 circuit, the low-pass filter 44 is employed for stabilizing the response of the circuit during normal operation and eliminating response to noise and the like. However, in the absence of a predetermined amplitude signal output from clamp 38, low-pass filter 44 is inoperative so far as eliminating higher frequency components is concerned. Consequently, the circuit is responsive for locking to the correct frequency more rapidly, at which point the amplitude signal appears as illustrated at 98 in FIG. 4, and low-pass filter 44 is commanded to resume its low-pass filtering function.

Figure 2:
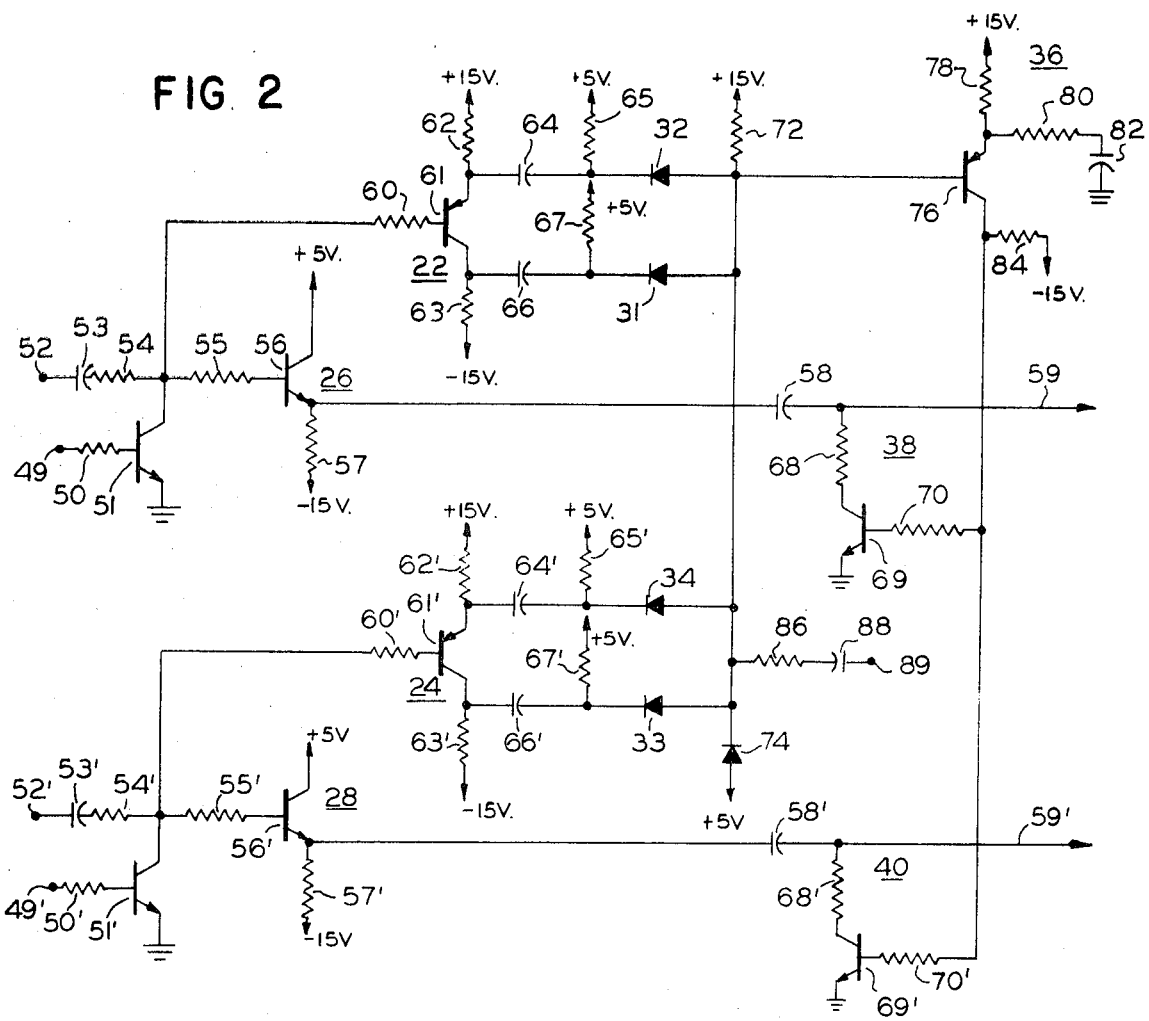
FIG. 2 is a schematic diagram of a circuit according to the present invention.

Referring to FIG. 2, illustrating a portion of the FIG. 1 circuit in greater detail, like reference numerals are employed to indicate corresponding parts of the circuit. FIG. 2 illustrates amplifiers 26 and 28 as well as inverters 22 and 24, burst pulse peak detector 36, and DC restore clamps 38 and 40. The amplitude signal channel will be first described, it being understood that the error signal channel is substantially identical. Input applied at terminal 52 corresponds to the output of low-pass filter 14 in FIG. 1 and is coupled through the series combination of capacitor 53, resistor 54, and resistor 55 to the base of NPN transistor 56 providing the function of AC amplifier 26. The collector of transistor 56 is connected to a positive voltage and its emitter is returned to a negative voltage through resistor 57. Transistor 56 operates as an emitter follower and provides the amplitude signal output on line 59 via DC restoring capacitor 58. The latter forms a part of the DC restore clamp 38.

The junction between resistors 54 and 55 is coupled through resistor 60 to the base of PNP transistor 61 which operates to provide the function of inverter 22. The emitter of transistor 61 is coupled to a positive voltage by means of resistor 62 and is coupled via capacitor 64 to the junction between a resistor 65 and the cathode of diode 32. The remaining terminal of resistor 65 is connected to a positive voltage, and the anode of diode 32 is connected to the base of PNP transistor 76 while also being returned to a positive voltage through resistor 72. The emitter circuit of transistor 61 provides the noninverted output of the low-pass filter 14 for application to diode 31. Transistor 76 is an element of burst pulse peak detector 36.

The collector of transistor 61 is provided with a load resistor 63, the remote terminal of which is coupled to a negative voltage. Also, the collector of transistor 61 is coupled via capacitor 66 to the junction between a resistor 67, returned to positive voltage, and to the cathode of diode 31 the anode of which is connected in common with the anode of diode 32. The collector circuit of transistor 61 provides the inverting function of element 22 in FIG. 1. Diode 74 has its anode connected to positive voltage and its cathode connected to the junction of the anodes of diodes 31 and 32 for limiting the negative going excursion at this point.

The emitter of transistor 76 is coupled to a positive voltage through resistor 78, and through resistor 80 to a storage capacitor 82, the remaining terminal of which is grounded. The collector of transistor 76 is provided with a load resistor 84 with the opposite terminal of resistor 84 being connected to a negative voltage. The collector of transistor 76 is also coupled to the base of an NPN transistor 69 through resistor 70. The emitter of transistor 69 is grounded, and the collector thereof is coupled to output line 59 by means of resistor 68. Transistor 69 also forms part of DC restore clamp 38.

The function of gate 18 in FIG. 2 is performed in part by an NPN transistor 51 having its emitter grounded and its collector connected to the junction between resistors 54 and 55. Terminal 49 receives a back porch gate signal which is coupled to the base of transistor 51 through resistor 50. The same back porch gate signal is also applied to terminal 89 which is coupled through the series combination of capacitor 88 and resistor 86 to the junction of diodes 31 and 32. The back porch gate is a negative going pulse which persists for the duration of the TV waveform back porch. It is conveniently generated by detecting the conclusion of the horizontal synchronization pulse, 90 in FIG. 3, and providing a timing circuit which maintains the negative pulse for substantially the exact time duration of the back porch, i.e. for the remainder of the horizontal blanking period. When this negative back porch gate is applied to terminal 49, transistor 51, theretofore maintained in conduction by a quiescent, relatively positive level at terminal 49, now ceases to conduct whereby the signal at terminal 52 can reach transistor 56 rather than being shunted to ground through transistor 51. Also a negative level replaces a positive level at terminal 89 at this time. In the absence of any color burst signal detected at all in the TV signal waveform (e.g. over a period of many horizontal scans), a small input is thereby provided enabling the peak detector and clamps to operate for clamping the output on line 59 substantially at ground level.

When a color burst envelope appears, one of the diodes 31 or 32 may conduct if the amplitude of the color burst envelope as coupled to a diode cathode is greater in magnitude than the color burst envelope magnitude coupled to the cathodes of any of the other diodes. In the set of diodes 31, 32, 33, and 34, the negative going signal appearing at the anode of such diode will cut off the other diodes and will generally cause transistor 76 to conduct. As a result, the emitter voltage of transistor 76 will become lower thereby changing the charge on capacitor 82. The charge on capacitor 82 will decrease only slightly between color burst envelope peaks so that transistor 76 will conduct substantially only at the peak of the color burst envelope and for substantially the duration of the color burst envelope. During conduction by transistor 76, its collector will be relatively positive going for applying a positive voltage to the base of transistor 69.

The circuit including transistor 69 and capacitor 58 operates in the following manner as a DC restoring clamp circuit. In the clamp "off" condition, the transistor 69 operates as two diodes back to back. The base of transistor 69 is relatively negative and the collector can go negative or positive since the transistor is turned off. If the collector went more than about five volts negative, the collector would conduct, but typically the collector at this time goes not more than about two volts negative.

When a peak of a color burst envelope is detected and the base of transistor 76 goes more negative than the charge on capacitor 82, the collector of transistor 76 goes positive turning on transistor 69, at its base, into a saturation condition. The transistor is now in its clamp "on" state. If the signal at the collector attempts to go positive, the transistor 69 operates in the normal manner as a saturated transistor, essentially shunting the positive going signal to ground. If the signal at the collector tries to go negative, the transistor 69 operates as a pair of diodes and the base current will divide in the two diodes until each drops a fraction of a volt. The collector diodes can then draw more current but in any case the collector is prevented from materially dropping in voltage at this time. Thus, the transistor 69 operates as a clamp for either positive or negative going signals as long as sufficient base current is provided. It is, of course, understood this clamping lasts for only the duration of the color burst envelope and capacitor 58 charges to the amplitude of the color burst envelope and in a direction for "DC restoring" the signal relative to the tips of the color burst, i.e. to level 101 in FIG. 4.

The lower portion of the circuit, constituting the error signal channel, operates in substantially the same manner as hereinbefore noted and therefore will not be discussed in detail. As hereinbefore stated in connection with FIG. 1, the amplitude signal on line 59 and the error signal, here produced on line 59', are employed for controlling oscillator 46 whereby the subcarrier reference frequency is exactly correct for achieving synchronous demodulation. It is noted that control is achieved at a low frequency level, i.e. after synchronous demodulation, and the desired bandwidth of control can be employed via low-pass filter 44 in FIG. 1 eliminating a preponderance of noise interference. The system provides enhanced signal-to-noise ratio in the error channel and accurate amplitude information from the amplitude channel. The color burst envelope, normally present in the amplitude channel when the system is locked in phase, is employed for accurately determining the DC restoration level for both the amplitude and error channels.

In the previously described embodiment, it has been assumed the D.C. controlled oscillator 46 may be quite stable in the absence of an error signal. For instance, the D.C. controlled oscillator 46 in FIG. 1 may be alternatively controlled relative to another standard in the absence of a significantly operative error signal from synchronous demodulator 12 in FIG. 1. In such case, four diodes 31–34 are desirably employed inasmuch as if only one diode were employed, the output of oscillator 46 could remain in the wrong phase to produce sampling by D.C. restoration or the like.

Figure 5:
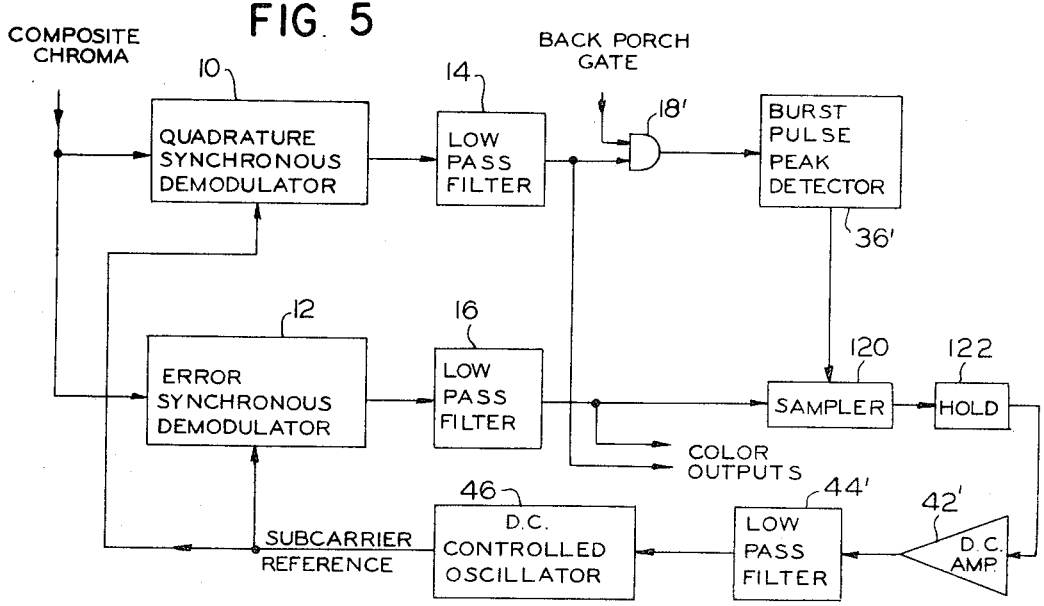
FIG. 5 is a block diagram of an apparatus according to a second embodiment of the present invention.

The usual controlled oscillator, for producing the local subcarrier frequency, will not be as highly stable as described above unless controlled by some other outside means in the absence of control by the error signal in FIG. 1. In such case, a more simplified system of frequency control by such error signal may be employed. For instance, a peak detector employing "one quadrant" peak detection instead of "four quadrant" peak detection is suitably employed. One quadrant peak detection in general corresponds to the utilization of diode 32 in FIG. 1, although it is of course understood that a diode need not specifically be employed. For instance, an amplifier arranged to conduct upon the presentation of a signal of a given polarity may be utilized. In FIG. 5, a simplified apparatus for color subcarrier generation is illustrated.

Referring to FIG. 5, the apparatus elements are similar to those in previous figures bearing corresponding reference numerals and operate in substantially the same fashion. A composite chroma signal is again applied to quadrature synchronous demodulator 10 and phase control synchronous demodulator 12. The outputs of the demodulators are respectively coupled through the low-pass filters 14 and 16 to and-gate 18' and sampler 120. The and-gate 18' receives not only the output of low-pass filter 14, but also the back porch gate as hereinbefore described, and provides an output for burst pulse peak detector 36' upon coincidence of the two inputs. Detector 36' is here considered as including unilateral conductor means, corresponding to diode 32 in FIG. 1, so that the most negative peak in the output of demodulator 10 will be detected, during the presence of the back porch gate. This corresponds to the negative going burst envelope indicated at 98 in FIG. 4, and especially peak 99 thereof.

Peak detector 36' energizes sampler 120 during the occurrence of the peak of the burst envelope from the quadrature demodulator. At this time, sampler 120 samples the burst envelope from the phase control synchronous demodulator and couples the same to hold circuit 122. Hold circuit 122 may comprise a storage element such as a capacitor or the like which remembers a value proportional to the sampled amplitude of the burst envelope from the phase control synchronous demodulator, until the sampler 120 operates for sampling the next such envelope. The sampling and holding of the error signal, as thus produced, provides an output quite similar to (but of reverse polarity from) the D.C. restored error signal in FIG. 1. In either case, a signal level substantially proportional to the error channel burst envelope is available between burst pulses. In place of sampler 120 and hold circuit 122 in FIG. 5, a D.C. restore clamp 40, as indicated in FIG. 1, may be employed. Such alternative is also hereinafter more fully described in connection with FIGS. 8 and 9. Such D.C. restore clamp also samples the burst envelope and remembers a value proportional thereto until the next sampling. The sampler and hold circuit configuration is herein illustrated for purposes of simplifying the explanation which follows, as well as for illustrating an alternative circuit configuration according to the present invention.

The output of hold circuit 122 in FIG. 5 is coupled to low-pass filter 44' via D.C. amplifier 42' for controlling oscillator 46. Since the output of hold circuit 122 is 180 degrees out of phase with the output which would have been derived from a D.C. restore clamp, the amplifier 42' may provide a phase inversion. The error signal from hold circuit 122 operates to control the frequency of oscillator 46. Thus, oscillator 46 includes a varactor coupled to or associated with the oscillator's tuned circuit for influencing the frequency thereof under the control of the output of D.C. amplifier 42'.

It will be noted that no amplitude signal output is employed to control low-pass filter 44' in FIG. 5. Rather, the characteristics of low-pass filter 44' remain substantially constant since an entirely D.C. control is employed in this embodiment relative to oscillator 46.

Figure 6:
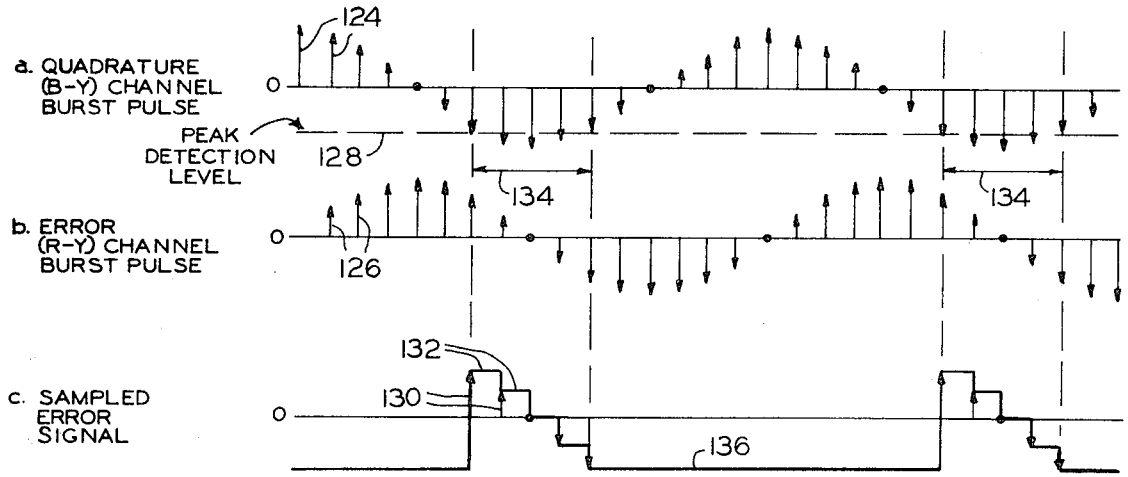
FIG. 6 is a waveform chart schematically illustrating operation of the second embodiment in a first condition thereof.

The operation of the FIG. 5 circuit will be explained with the aid of the diagrams illustrated in FIGS. 6 and 7. In FIG. 6, the oscillator 46 is assumed to be producing an output which is higher in frequency than desired, while in FIG. 7, the oscillator frequency is assumed to be lower than desired. Arrows 124 in FIG. 6a are indicative of the polarity and magnitude of the quadrature channel burst envelopes, or pulses, as successively appear at the input of peak detector 36', assuming the oscillator to be operating at a higher frequency than desired. Arrows 126 in FIG. 6b are indicative of the magnitude and polarity of error channel burst envelopes, e.g. at the input to sampler 120, again assuming the oscillator to be high in frequency. The peak detector, 36', will only detect the most negative envelope or envelopes in the quadrature channel, depending upon the degree of charge accumulated by a peak storage capacitor included in peak detector 36'. A peak detection level 128 is assumed, which the quadrature channel burst envelopes must exceed before peak detector 36' provides an output to sampler 120.

In FIG. 6c, the samples actually taken by sampler 120 from the error channel burst envelopes are illustrated by arrows 130. Between samples, the last value sampled is remembered by hold circuit 122, producing steps 132. In the particular instance illustrated, samples are taken during sampling time 134, while the quadrature burst channel envelopes are most negative, and not at other times. As a result, after each sampling time 134 a net negative D.C. level 136 will be left on the hold circuit and will be remembered until the next sampling time when the quadrature channel burst envelope becomes more negative than peak detection level 128.

Figure 7:
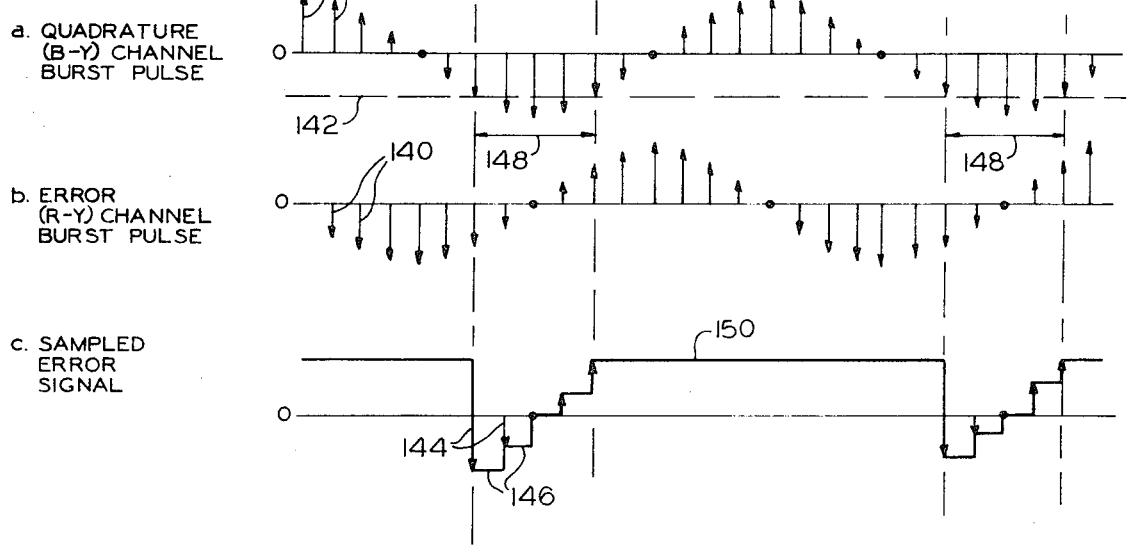
FIG. 7 is a similar waveform chart schematically illustrating operation of the second embodiment in a second condition thereof.

Now, referring to FIG. 7, wherein an oscillator frequency is assumed that is too low, arrows 138 represent quadrature channel burst envelopes while arrows 140 represent error channel burst envelopes. As the quadrature channel burst envelopes exceed peak detection level 142, values represented at 144 are sampled by sampler 120, and steps 146 represent the values thereof stored or held between samples. As illustrated in FIG. 7, sampling only occurs when quadrature channel burst envelopes 138 exceed peak detection level 142, i.e., only at sampling times 148. Between sampling times 148, a net positive level 150 is remembered by hold circuit 122. It will be seen that if the frequency of the oscillator is too high, as illustrated in FIG. 6, the output from hold circuit 122 will be predominantly negative as indicated at 136 in FIG. 6, while if the frequency of the oscillator is too low, the output of hold circuit 122 will be predominantly positive as indicated at 150 in FIG. 7. The output is always such as to move the controlled oscillator 46 towards the correct frequency. This circuit is effective over a wide frequency range, and since the output of the hold circuit is predominantly D.C., a quadrature channel amplitude signal does not need to be applied for changing the characteristic of low-pass filter 44'. Since the last sample is remembered between sampling times, a relatively large D.C. component results. A wide pull-in range is achieved even though a narrow bandwidth low-pass filter 44 is suitably employed in the error channel. This filter, of course, stabilizes the response of the circuit, eliminating response to noise and the like.

Figure 8:
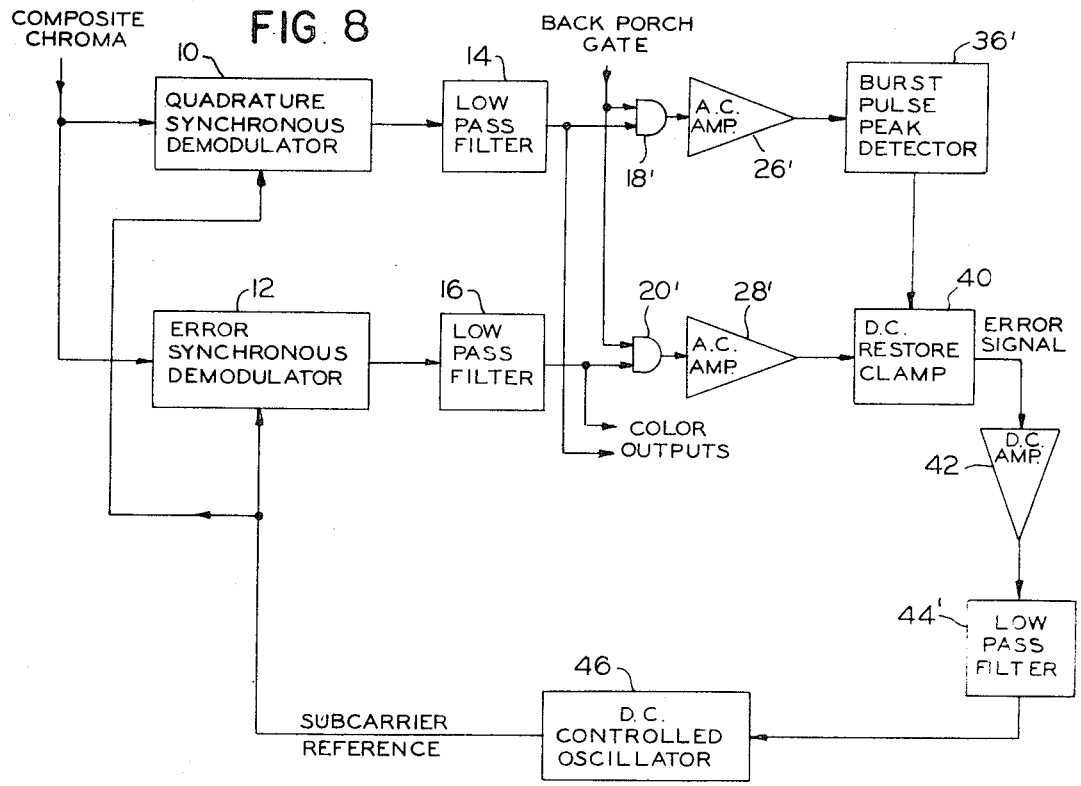
FIG. 8 is a block diagram of an apparatus according to yet another embodiment of the present invention.

Referring to FIG. 8, an embodiment is illustrated which is substantially similar to the FIG. 5 embodiment, but substitutes the D.C. restore clamp 40 for sampler 120 and hold circuit 122. The elements are similar to those of FIGS. 1 and 5 bearing corresponding reference numerals and operate in a substantially similar manner except as herein explained. The circuit employs and-gates 18' and 20' in the quadrature and error channels respectively, as well as amplifiers 26' and 28'. The back porch gate signal operates both and-gates 18' and 20'. The burst pulse peak detector again includes unilateral conducting means for detecting quadrature channel burst envelopes as exceed a remembered peak detection level, as illustrated for instance in FIG. 6a and FIG. 7a. I.E. detection is on a "single quadrant" basis. Sampling occurs at times 134 and 148 (as in FIGS. 6 and 7), employing D.C. restore clamp 40 to provide such sampling of the output of amplifier 28' by D.C. restoration. It will be understood, therefore, that the sampled error signal output from D.C. restore clamp 40 will be substantially the inverse of the sampled error signal output as illustrated in FIGS. 6c and 7c, and the output of D.C. amplifier 42 has the same phase relation to the circuit as was the case in the FIG. 1 embodiment. The circuit operates in general as described in connection with the FIG. 5 embodiment, with the exception, of course, of the operation of the D.C. restore clamp 40 wherein the output of amplifier 28' is clamped at times corresponding to the peaks of the burst pulse envelopes. Clamping occurs, however, only during sampling times 134 or 148. Consequently, the error signal output from D.C. restore clamp 40 remains substantially constant between sampling times 134 or 148 resulting in a substantial D.C. component for controlling oscillator 46. Again, low-pass filter 44' may have a constant low pass characteristic.

Figure 9:
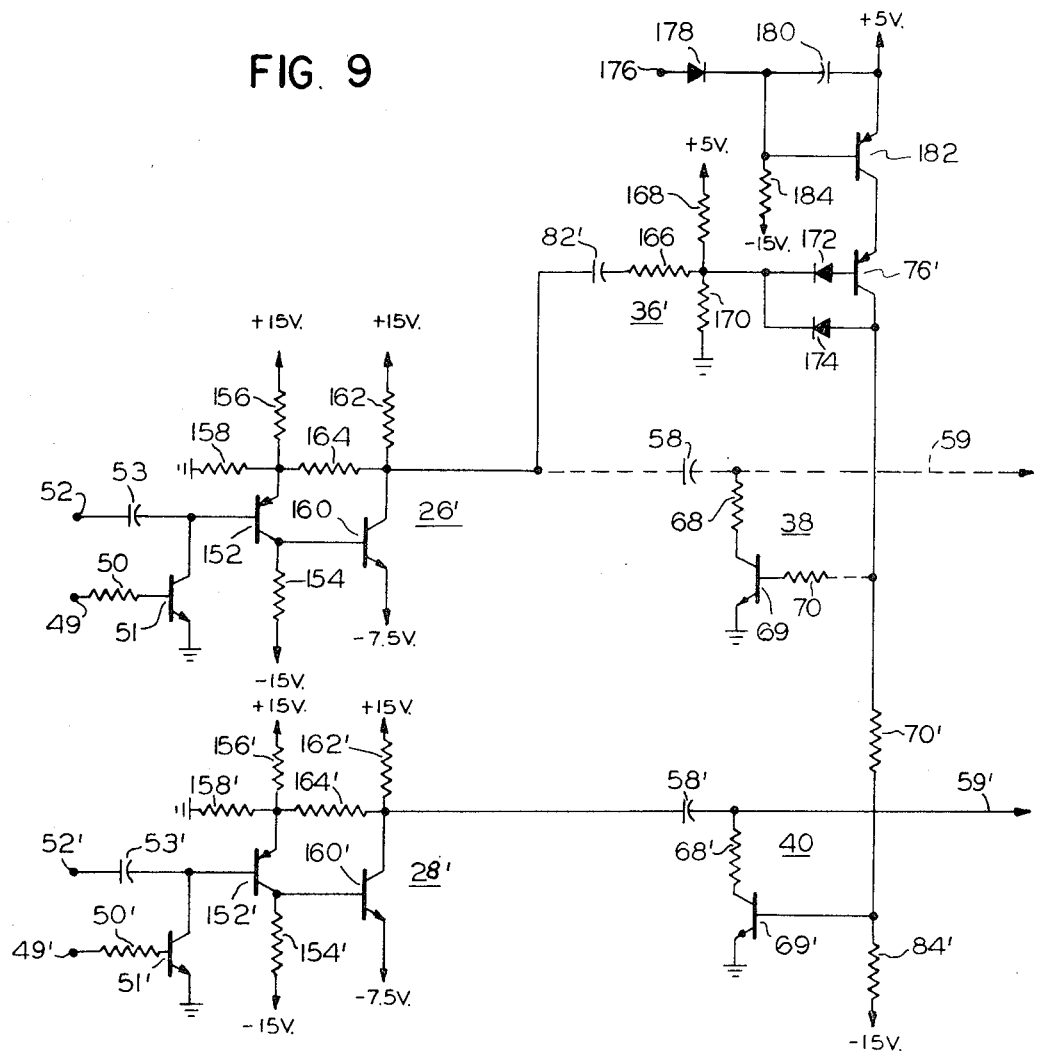
FIG. 9 is a schematic diagram of a circuit according to the FIG. 8 embodiment.

Turning to FIG. 9, portions of the FIG. 8 circuit are illustrated in greater detail in schematic diagram form, and will be explained with reference thereto. FIG. 9 illustrates amplifiers 26' and 28', burst pulse peak detector 36' and D.C. restore clamp 40. Also illustrated is a D.C. restore clamp 38 including restoring capacitor 58 to provide an amplitude output 59. It is understood this portion of the circuit together with the amplitude output lead at 59 is not necessary to the control of the local subcarrier oscillator, but can be employed for other purposes as desired.

The upper or quadrature channel will be first described, it being understood that the error signal channel is substantially identical where referred to by similar reference numerals, and operates in a similar manner. Input applied at terminal 52 corresponds to the output of low-pass filter 14 in FIG. 8 and is coupled through capacitor 53 to the base of PNP transistor 152 which, together with NPN transistor 160, provides the amplifier 26' in FIG. 8. The collector of transistor 152 is supplied with a load resistor 154 connecting such collector to a −15 volts, and the collector is also directly connected to the base of transistor 160 having its emitter returned to a −7.5 volts. The emitter of transistor 152 is returned to a +15 volts, with a resistor 158 being interposed between the emitter of transistor 152 and ground. The collector of transistor 160 is provided with a load resistor 162 coupling the collector to a positive 15 volts, while a feedback resistor 154 is located between the collector of transistor 160 and the emitter of transistor 152. Transistors 152 and 160 form a noninverting operational amplifier, the gain of which equals $1 + R_{164}/R_{158}$. This amplifier is characterized by low output impedance for driving capacitor 82' (and capacitor 58 if used). The base of transistor 152 also provides a very high input impedance, allowing capacitor 53 to be small, and allowing ease of operation of transistor 51 to perform a back porch gating function.

Thus, the function of gate 18' in FIG. 8 is performed in part by NPN transistor 51 having its emitter grounded and its collector connected to the base of transistor 152. Terminal 49 receives a back porch gate signal through resistor 50. The same back porch gate signal is also applied to terminal 49' and to terminal 176 which is coupled through diode 178 to a first terminal of capacitor 180 the opposite terminal of which is returned to +5 volts, as well as to the base of transistor 182. The base transistor 182 is also returned to a −15 volts via resistor 184, while its emitter is connected to a +5 volts. The collector of transistor 182 is connected to the emitter of transistor 76', the latter comprising an element of burst pulse peak detector 36'. The collector of transistor 76' is coupled to the base of transistor 69 via resistor 70 (if circuit 38 is used), and via resistor 70' to the base of transistor 69'. Transistor 69' forms a part of D.C. restore clamp 40, this D.C. restore clamping circuit (as well as circuit 38) operating in the manner hereinbefore set out with respect to the FIG. 2 embodiment. The base of transistor 69' is returned to a −15 volts by means of resistor 84'.

The back porch gate, applied to terminals 49 and 176, as well as to terminal 49', is a negative going pulse which persists for the duration of the TV waveform back porch. When this negative back porch gate is applied to terminal 49, transistor 51, theretofore maintained in conduction by a quiescent, relatively positive level at terminal 49, now ceases to conduct whereby the signal at terminal 52 can reach transistor 152 rather than being shunted to ground through transistor 51. Of course, the same back porch gate similarly affects transistor 51'. Also, the negative level replaces a positive level at terminal 176 at this time. As the negative level is applied, cutting off diode 178, capacitor 180 charges negatively through resistor 184. The RC time constant of the 184–180 combination is such that a very short delay is provided until transistor 182 turns on. This delay is typically about one microsecond and prevents improper operation of the circuit. This delay prevents sampling or D.C. restoration in response to the back porch gate alone, when a quadrature channel burst envelope or pulse is actually present. When transistor 182 turns on, current flows through the emitter-collector path thereof and through the emitter-collector path of transistor 76' causing transistors 69 and 69' to saturate during the back porch gate, if no quadrature channel burst envelope is present. As a result, the outputs at 59 and 59' will be clamped to ground at these times. However, if a burst pulse or envelope is present in a quadrature channel, a negative input pulse is provided at the left-hand terminal of capacitor 58.

Burst pulse peak detector 36' includes a capacitor 82' having one terminal connected to the collector of transistor 160, and the other terminal coupled to resistor 166 and diode 172, disposed in series in that order between capacitor 82' and the base of transistor 76'. A resistor 168 connects the junction between resistor 166 and diode 172 to a +5 volts, while the same junction is returned to ground through a resistor 170. A diode 174 is interposed between the aforementioned junction and the collector of transistor 76'. The cathodes of diodes 172 and 174 are connected together.

When a quadrature channel burst envelope is present, capacitor 82' becomes charged to a value determined by the most negative value of the burst envelope, and by the drop through resistor 166, diode 172, and transistor 76'. This charging occurs only during the most negative repetitions of the burst envelope or pulse, and at substantially the peak value thereof. It can also occur only during the back porch gate, because otherwise transistor 76' will receive no emitter current. When capacitor 82' becomes charged, transistor 76' and diode 172 will not be turned on, even during the presence of the back porch gate, unless a subsequent negative pulse is at least substantially as negative as the previous pulse peak causing storage on capacitor 82'. The "pick-off level" or peak detection level (128 in FIG. 6 and 142 in FIG. 7) is determined by the average level to which capacitor 82' is charged. Capacitor 82' tends to hold the charge and discharges only slowly in the absence of conduction in transistor 76'. In this circuit, transistor 76' may be considered as the unilateral conductor taking the place of diode 32 in the FIG. 1 circuit, or alternatively, both transistor 76' and diode 72 may be viewed as performing the unilateral conductor function forming a single quadrant peak detector.

When the incoming quadrature channel burst envelope does produce charging of capacitor 82', transistor 76' conducts as hereinbefore mentioned, and turns on the D.C. restore clamps 38 and 40. These will be turned on only for the duration of the sampling times (134 and 148 in FIGS. 6 and 7) i.e. at such times as capacitor 82' receives more charge. Consequently, D.C. restoring will take place only at such times, leaving a predominately D.C. level on restoring capacitors 58 and 58' between sampling times. As hereinbefore mentioned in connection with FIG. 8, the net D.C. component produced controls oscillator 46 in a substantially D.C. manner such that low-pass filter 44' does not require switching. The control signal is taken from D.C. restore clamp 40 on lead 59' and will be supplied therefrom to D.C. amplifier 42. A wide pull-in range is again achieved even through a narrow bandwidth low-pass filter 44' is employed in the error channel. Also, as hereinbefore mentioned, the D.C. restore clamp 38, in FIG. 9, is not necessary to the operation of the presently described device, and may be eliminated if only control of the local oscillator 46 is desired.

Of course, when the oscillator is "on frequency," the output from D.C. restore clamp 40 will be substantially zero as in the FIG. 1 embodiment, but will vary from zero in a D.C. range if the phase of oscillator 46 tends to change, in a manner to restore the oscillator to the proper phase and frequency for bringing about synchronous demodulation. In the systems of FIGS. 5 through 9, the sampler is "opened," or D.C. restoration takes place, in the error channel only during the time that the regenerated subcarrier from oscillator 46 is within approximately ±45° of the proper phase. In the phase locked mode of operation, the system behaves as a phase locked loop, with the burst sample time being accurately controlled by itself. In the unlocked state, that is during pull-in, the system provides the large D.C. error signal of the proper polarity to shift the oscillator frequency in the proper direction to achieve phase lock. No wide bandwidth error channel is required to develop the error signal.

Diodes 172 and 174 are primarily employed to provide reverse breakdown protection and to prevent saturation of transistor 76', Rather than being principally employed as unilateral conduction means in the peak detector. Thus, transistor 76' would perform the unilateral conducting function without diodes 172 and 174. However, the diode 172 turns off with positive swings at the output of transistor 160 to prevent breakdown of transistor 76'. Also, if transistor 76' tends toward saturation during negative peak detection, diode 174 conducts. The base current that would have then gone into transistor 76' passes through diode 174. Consequently, saturation is avoided and turn-off time of this circuit is decreased.

While I have shown and described preferred embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:
1. A method of controlling color subcarrier generation comprising:
synchronously demodulating chroma information from a color television signal in a pair of quadrature related channels by means of a color subcarrier reference signal,
detecting a demodulated burst envelope from the synchronously demodulated output of one of said channels,
providing a value representative of the amplitude of the demodulated burst envelope from the remaining channel in response to such detection,
generating a color subcarrier reference signal, and
controlling the frequency of the color subcarrier reference signal employing the value representative of the amplitude of the demodulated burst envelope for causing the frequency of the color subcarrier reference signal to change until the said value representative of amplitude attains a predetermined condition.

2. The method of claim 1 wherein the burst envelope is detected from the demodulated output of the said one of said channels only as such burst envelope exceeds a predetermined magnitude and has a predetermined polarity.

3. The method of generating a television color subcarrier signal comprising:
synchronously demodulating chroma information from a color television signal,
detecting a peak in the color synchronizing burst envelope from a synchronously demodulated output,
sampling another synchronously demodulated output signal when a peak in the color synchronizing burst envelope is detected, and storing a value indicative of the amplitude of the sampled demodulated output signal between samplings,
generating a local r.f. signal, and
controlling the frequency of said local r.f. signal employing the stored output for causing the frequency of the local signal to change until the said stored output attains a predetermined condition.

4. The method according to claim 3 including sampling the said another synchronously demodulated output signal by D.C. restoring such signal at sampling times.

5. The method of generating a television color subcarrier signal comprising:
synchronously demodulating chroma information from a color television signal,
detecting the color synchronizing burst envelope from the synchronously demodulated output,
setting a reference value for the synchronously demodulated output waveform at times responsive to detection of said color synchronizing burst envelope,
generating a local r.f. signal, and
controlling the frequency of said local r.f. signal in response to the synchronously demodulated output waveform having said predetermined reference value for causing the frequency of the local signal to change until the said demodulated output waveforms attains a predetermined condition.

6. The method according to claim 5 further including gating the synchronously demodulated output waveform during the time period within which the color synchronizing burst can normally occur.

7. The method according to claim 5 wherein said color synchronizing burst envelope is detected by means of rectification and detection of the peak of the signal as rectified.

8. The method according to claim 7 wherein said rectification is accomplished in four quadrants corresponding to positive and negative polarities for both channels of quadrature related synchronous demodulation.

9. Apparatus for generating a local color subcarrier from a color television signal comprising:
first means for synchronously demodulating the chroma information from said color television signal providing a synchronously demodulated output signal for the time period range during which the color synchronizing burst signal can occur,
second means for receiving the signal from the first means and detecting a synchronously demodulated color synchronizing burst envelope by means of detecting the peak of such envelope,
third means responsive to such detection for providing an output signal representative of the amplitude value of a color synchronizing burst envelope of one synchronously demodulated output signal,
fourth means for generating a local r.f. signal, and
fifth means for controlling the frequency of the local r.f. signal employing said output signal representative of said amplitude value for causing the frequency of the local r.f. signal to change until the output signal representative of the amplitude value attains a predetermined condition.

10. The apparatus according to claim 9 wherein the third means responsive to such detection for providing an output signal comprises means for gating a burst envelope at the time of such detection and means for holding the value thereof between detections.

11. The apparatus according to claim 9 wherein the third means responsive to such detection for providing an output signal comprises means for D.C. restoring a synchronously demodulated output at times of said detection.

12. Apparatus according to claim 9 wherein the second means for detecting include unilateral conducting means responsive to at least a given polarity of synchronously demodulated information.

13. Apparatus for control of color subcarrier generation comprising:
a pair of synchronous demodulators for receiving a color television composite chroma signal and demodulating the same in quadrature relation by means of a color subcarrier reference signal,
means for detecting a demodulated burst envelope from the output signal of one of said synchronous demodulators,
means responsive to such detection for providing an output signal representative of the amplitude value of the demodulated burst envelope from the remaining synchronous demodulator.
means for generating the color subcarrier reference signal, and
means for controlling the frequency of said color subcarrier reference signal employing said output signal representative of the amplitude value of a demodulated burst envelope for causing the frequency of the color subcarrier reference signal to change until said output representative of the amplitude value attains a predetermined condition.

14. The apparatus according to claim 13 wherein said means for detecting includes peak detector means.

15. The apparatus according to claim 13 wherein said means responsive to said detection for providing an output signal, holds an output level to provide such output signal between demodulated burst envelopes from the said remaining synchronous demodulator.

16. The apparatus according to claim 13 wherein said means for detecting includes unilateral conductor means responsive to a given polarity of output signal from said one of said synchronous demodulators.

17. The apparatus according to claim 13 wherein said means responsive to the detection for providing an output signal comprises means for sampling the output signal from the remaining synchronous demodulator and means for holding said output signal between samplings.

18. The apparatus according to claim 13 wherein said means responsive to the detection comprises means for D.C. restoring the output signal of the remaining synchronous demodulator at times of said detection.

19. The apparatus according to claim 13 wherein the synchronous demodulators provide demodulated output signals at times substantially corresponding to the presence of the back porch of the color television signal.

20. Means for providing a reference signal corresponding to a color television synchronizing burst comprising:
synchronous demodulator means,
means for detecting the color synchronizing burst envelope of an output signal of the synchronous demodulator means, and
means for providing a preset reference value for the waveform of one synchronizing burst envelope output signal of said synchronous demodulator means at times corresponding to said detection.

21. The apparatus according to claim 20 wherein said detecting means comprises rectifier means and means for detecting the peak of the signal rectified.

22. The apparatus according to claim 20 wherein said synchronous demodulator means comprises quadrature related synchronous demodulators, and wherein said detecting means comprises four rectifiers for detecting both inverted and noninverted outputs of said synchronous demodulators.

23. The circuit according to claim 22 further including means for gating the synchronously demodulated outputs substantially at the time of the back porch of the said color television signal.

24. Apparatus for generating a local color subcarrier from a color television signal comprising:
means for synchronously demodulating the chroma information from said color television signal providing a synchronously demodulated output signal for the time period range during which the color synchronizing burst signal can occur,
means for detecting the color synchronizing burst envelope as synchronously demodulated,
means for DC restoring the output signal of the synchronously demodulated means at times when said color synchronizing burst is detected by said means for detecting,
a controlled oscillator for generating said local subcarrier for application as a reference signal to said synchronously demodulating means, and means coupling a DC restored output signal of the synchronously demodulating means to control said oscillator.

25. Apparatus according to claim 24, wherein said means for detecting comprises a rectifier 26. The apparatus according to claim 24 wherein said synchronously demodulating means comprises quadrature related synchronous demodulators, and wherein said detection means comprises four rectifier means coupled to receive both inverted and noninverted output signals of said synchronous demodulators.

27. The apparatus according to claim 26 wherein said means for detecting further comprises a peak detector receiving the output signal of said rectifier means for operating said DC restoring means at the time of peaks corresponding to said color synchronizing burst envelope.

28. The apparatus according to claim 25 wherein said detector further includes peak detection means receiving the output signal of said rectifier for operating said DC restoring means at the time of peaks corresponding to said color synchronizing burst envelope.

29. The apparatus according to claim 24 wherein said means for synchronously demodulating the chroma information provides said demodulated output signal for a time substantially corresponding to the presence of the back porch of the color television signal.

30. Apparatus for color subcarrier generation comprising:
a pair of synchronous demodulators for receiving a color television composite chroma signal and demodulating the same in quadrature relation to one another by means of a color subcarrier reference signal,
means for gating the outputs of said synchronous demodulators at a time substantially corresponding to the back porch of the color television signal,
four quadrant detection means for detecting a given polarity of color synchronizing burst signal envelope from inverted and noninverted outputs of each synchronous demodulator as gated, and including means for detecting the peak of the detected signal,
a DC restoration circuit coupled to the gated output of each synchronous demodulator, said DC restoration circuits being controlled to DC restore such gated output at the time a color synchronizing burst signal enveloped is detected,
a local signal generator for providing said color subcarrier reference signal, and
means for coupling the output signal of one of said DC restoration circuits to control the frequency of said local signal generator.

31. Apparatus according to claim 30 including means for coupling the output signal of the other restoration circuit to control the frequency range of the output coupled from the first restoration circuit.

32. Apparatus for color subcarrier generation comprising:
quadrature and phase control synchronous demodulators for receiving a color television composite chroma signal and demodulating the same in quadrature relation to one another by means of a color subcarrier reference signal,
means for gating the outputs of said synchronous demodulators at a time substantially corresponding to the back porch of a color television signal,
single quadrant detection means for detecting only peaks of a given polarity of the color synchronizing burst signal envelope from the quadrature synchronous demodulator as gated,
a D.C. restoration circuit coupled to the gated output signal of the phase control synchronous demodulator, said D.C. restoration circuit being controlled to D.C. restore such gated output signal at the time said color synchronizing burst signal envelope peaks of a given polarity are detected by said detection means,
a local signal generator for providing said color subcarrier reference signal, and
means for coupling the output signal of said D.C. restoration circuit to control the frequency of said local signal generator.

33. The apparatus according to claim 32 wherein said detection means includes capacitor means for substantially storing values in response to previously detected peaks.

34. The apparatus according to claim 32 wherein said detection means includes unilateral conducting means to render the same sensitive only to peaks of said given polarity.

* * * * *